United States Patent [19]

Karaba

[11] 4,141,324
[45] Feb. 27, 1979

[54] LOW EMISSION INTERNAL COMBUSTION ENGINE

[75] Inventor: Albert M. Karaba, Muskegon, Mich.

[73] Assignee: United States of America, Washington, D.C.

[21] Appl. No.: 733,303

[22] Filed: Oct. 18, 1976

[51] Int. Cl.² ............... F02M 59/20; F02D 23/00; F02M 25/06; F02B 75/04
[52] U.S. Cl. ............... 123/32 R; 123/32 C; 123/119 A; 123/139 AP; 123/78 R; 123/119 C
[58] Field of Search ............... 123/32 C, 32 R, 119 C, 123/119 A, 139 AP, 78 R; 60/598, 605, 617

[56] References Cited

U.S. PATENT DOCUMENTS

| | | | |
|---|---|---|---|
| 2,594,681 | 4/1952 | Ricardo et al. | 123/32 |
| 3,777,724 | 12/1973 | Kiley | 123/32 C |
| 3,815,564 | 6/1974 | Suda et al. | 123/139 AP |
| 3,915,134 | 10/1975 | Young | 123/119 A |
| 3,925,989 | 12/1975 | Pustelnik | 123/119 A |
| 3,973,540 | 8/1976 | List | 123/139 AP |

OTHER PUBLICATIONS

The High Speed Internal Combustion Engine; Harry Ricardo and H. Glyde third edition reprinted 1944, pp. 412, 415, 416, 417 and title page.
The High Speed Internal Combustion Engine; Harry Ricardo and J. Hempson, Fifth Edition, 1968, pp. 32, 33, 34 and title page.
Air Pollution Control In Transport Engines; The Institute of Mechanical Engineers 1972, pp. 21–33 and title page.
11th Summary Report CONF-761028, UC-96, TEC 77/001 title page and pp. 141–157 Contractors Meeting Oct. 18, 1976.

Primary Examiner—Wendell E. Burns
Attorney, Agent, or Firm—Gifford, Chandler, VanOphem, Sheridan & Sprinkle

[57] ABSTRACT

A low emission, internal combustion compression ignition engine having a cylinder, a piston movable in the cylinder and a pre-combustion chamber communicating with the cylinder near the top thereof and in which low emissions of $NO_x$ are achieved by constructing the pre-combustion chamber to have a volume of between 70% and 85% of the combined pre-chamber and main combustion chamber volume when the piston is at top dead center and by variably controlling the initiation of fuel injection into the pre-combustion chamber.

11 Claims, 4 Drawing Figures

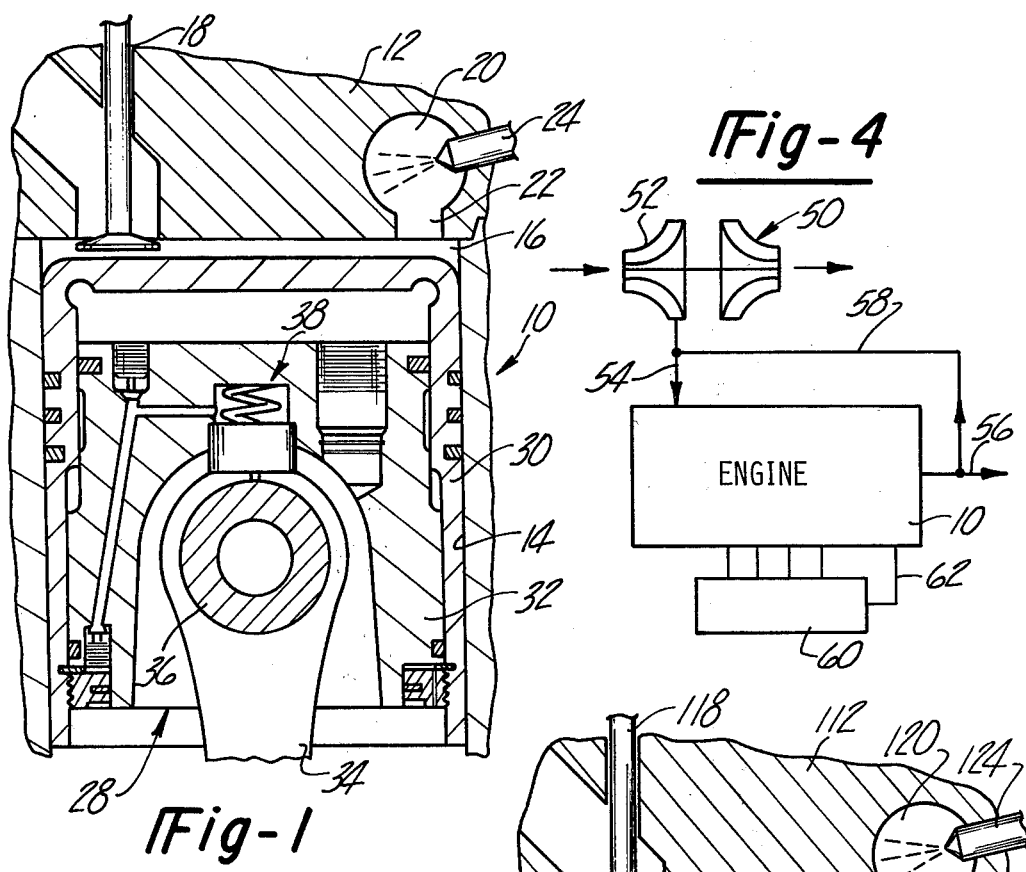
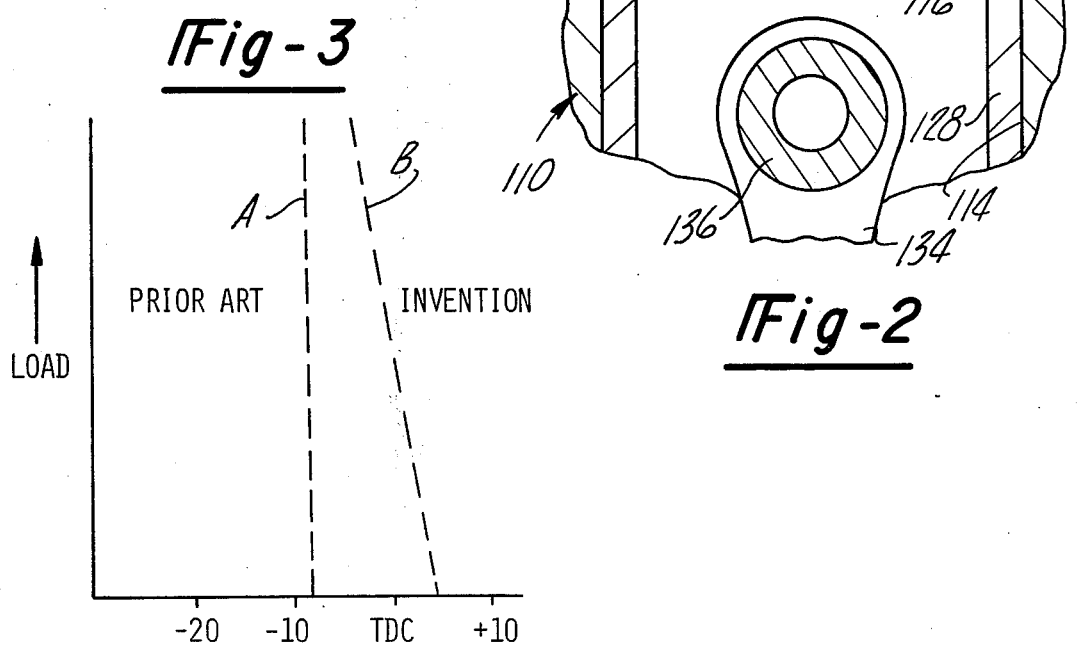

LOW EMISSION INTERNAL COMBUSTION ENGINE

The invention described herein was made in the course of or under a contract with the U.S. Energy Research Development Administration.

BACKGROUND OF THE INVENTION

1. Field of the Invention

The present invention relates to internal combustion compression ignition engines and more particularly to such an engine constructed to achieve low emissions of $NO_x$ and hydrocarbons.

2. Description of the Prior Art

There has been a great amount of effort expended in recent years in attempts to provide internal combustion engines for vehicle use with much lower levels of $NO_x$ and hydrocarbon emission than are presently possible. This effort has been dictated in large part by the U.S. Government standards which mandate decreasing levels of such emissions each year for the next several years coupled with the threat of fines and other sanctions if automotive producers fail to meet the prescribed standards.

Although these attempts have taken many forms, and special attention has been given to compression ignition diesel engines, no one to my knowledge has, to date, recognized the relationship between the levels of emission of $NO_x$ and the volume of a pre-combustion chamber with respect to the total combustion chamber volume at TDC of the piston in such engines.

In fact the prior art teaches that the volume of a precombustion chamber should not be more than 50% of the total combustion chamber volume to achieve an efficient engine.

There also has been some recent work which indicates that retarding the initiation of fuel injection in compression ignition engines with respect to presently acceptable standards effectively reduces the emissions of $NO_x$. The difficulty encountered, however, with engines equipped to retard the initiation of fuel injection has been misfiring and an increase of hydrocarbon emissions at light load. No one to my knowledge has suggested that high compression ratios at light loads and a fuel injection means which variably retards the initiation of fuel injection dependent upon engine speed and/or load will overcome this problem of misfiring and will effectively reduce hydrocarbon emissions even at light load while at the same time producing the low levels of $NO_x$ emissions normally accompanying retarded fuel injection.

Variable compression ratio (VCR) engines are, of course, not new. These are engines in which the compression ratio of the engine is varied to maintain a predetermined maximum combustion chamber pressure. Such engines provide relatively high compression ratios at light loads to improve starting and operating characteristics. The assignee of this application has been quite active in the development of such engines. Again, however, there have been no previous engines of the type in which a pre-combustion chamber is sized to provide more than 50% of the total combustion chamber volume at light loads.

SUMMARY OF THE INVENTION

The present invention comprises an internal combustion compression ignition engine having a cylinder with a reciprocating piston and a main combustion chamber above the piston. A precombustion chamber communicates with the main combustion chamber. The volume of the pre-combustion chamber is between 70% and 85% of the combined volume of the pre-combustion chamber and the main combustion chamber at top dead center (TDC) of the piston.

Further, the engine is preferably provided with fuel injection means to provide fuel to the pre-combustion chamber and thus to the main combustion chamber. Initiation of the fuel injection is significantly retarded from the normal of approximately 10° crank angle before TDC to somewhere within the range of 5° crank angle before TDC to 20° crank angle after TDC.

These features have been found to significantly reduce emissions of $NO_x$.

In one embodiment of the present invention a VCR engine is utilized so that compression ratios in the range of 24-1 to 30-1 can be maintained in the low and middle range of operation of the engine. These relatively high compression ratios effectively reduce the emissions of hydrocarbons and the major portion of vehicle use occurs in the low and middle range of engine operation. This is the range in which most urban driving is accomplished and urban driving is the major source of emission problems.

A supercharging means such as a turbocharger is provided to maintain a high intake manifold pressure which is necessary to operate such engines during their high compression cycle. Means are also preferably provided to recirculate exhaust gases to the intake manifold at least during light loads to contribute to the reduction of hydrocarbon emissions during this range of engine operation.

BRIEF DESCRIPTION OF THE DRAWING

A clearer understanding of the present invention will be achieved by reference to the accompanying drawings wherein like reference numerals refer to like parts throughout the several views and in which:

FIG. 1 is a fragmentary cross-sectional view through one embodiment of an internal combustion engine constructed in accordance with the principles of the present invention and illustrating its use in a VCR engine;

FIG. 2 is a fragmentary cross-sectional view similar to the embodiment in FIG. 1 but illustrating another preferred embodiment of the present invention;

FIG. 3 is a graph illustrating the injection timing of conventional pre-combustion chamber compression engines and the variable injection timing of the engines of the present invention; and FIG. 4 is a view illustrating diagrammatically the various components of a preferred engine.

DESCRIPTION OF THE PREFERRED EMBODIMENTS

Now referring to the drawings for a more detailed description of the present invention, FIG. 1 illustrates an internal combustion engine 10 comprising a cylinder head 12 and a cylinder member 14 which is closed at its top end by the cylinder head 12 to define a main combustion chamber 16.

Although only the intake valve 18 is illustrated it is to be understood that the engine 10 is provided with rocker arm actuated exhaust valves (not shown) which operate in the conventional manner. The cylinder head 12 is further provided with a pre-combustion chamber 20 which is substantially spherical and which opens to the main combustion chamber 16 by a passage 22. A fuel nozzle 24 is carried in the cylinder head 12 and is disposed to inject fuel into the pre-combustion chamber 20. The nozzle 24 is positioned in a manner to combine with the spherical contour of the pre-combustion chamber 20 to impart a swirl to the fuel air mixture to produce a nearly homogenous mixture. This is, of course, not new and is well known in the art.

In FIG. 1 a variable compression ratio (VCR) piston 28 is mounted for reciprocation in the cylinder member 14 and consists of two main parts; a piston shell 30 and a piston pin carrier 32. The carrier 32 is linked to the crankshaft (not shown) of the internal combustion engine 10 by a connecting rod 34 and a piston pin 36.

As is conventional in VCR engines of this type, the carrier 32 moves between fixed upper and lower limits while the shell 30, being telescopically received on the carrier 32, is free to move within certain limits to provide a variable height from the center of the piston pin 36 to the top of the shell 30. This variable height provides a variation in the compression ratio of the engine as is well known in this type of VCR engine.

A hydraulic system 38 is provided to insure that the shell 30 will be at its extreme extended position during initial and low load operation and that it will move to a position producing a lower compression ratio as the engine is operated at higher loads. This system is now conventional and has been amply described in previous patents owned by Applicant's assignee, such as U.S. Pat. Nos. 3,403,662; 3,418,982; 3,450,111 and 3,417,739, as well as others and therefore need not be described in detail here.

The VCR engine illustrated in FIG. 1 is intended to operate with compression ratios in ranges between 24-1 and 30-1, at least during light and medium load operation of the engine. The pre-combustion chamber 20 is of a relatively large volume with respect to the volume of the main combustion chamber 16 at TDC of the piston 28 to insure that there will be a relatively high air-fuel ratio in the pre-combustion chamber 20 at the upper part of the compression stroke of the piston 28. The relatively high compression ratios insure that the air-fuel mixture in the pre-combustion chamber will ignite during the compression stroke.

To insure the desired high air-fuel ratio in the pre-combustion chamber 20 the ratio of the volume of the pre-combustion chamber is preferably between 70% and 85% of the combined volume of the pre-combustion chamber 20 and the main combustion chamber 16 at TDC of the piston 28.

FIG. 2 illustrates another preferred embodiment of the invention which comprises an internal combustion engine 110 having a cylinder head 112 with a substantially spherically formed pre-combustion chamber 120 and a conventional piston 128 linked to the crankshaft (not shown) of the engine 110 by a connecting rod 134 and a piston pin 136. In this type of engine the piston 128 moves between fixed limits within a cylinder 114 so that the combustion chamber 116 has a constant volume at TDC of the piston 128 throughout all ranges of engine operation.

An intake valve 118 and conventional exhaust means (not shown) are provided. The pre-combustion chamber 120 opens to the main combustion chamber 116 through a passage 122 and a fuel injector nozzle 124 is mounted in the cylinder head 112 to inject fuel into the pre-combustion chamber 120.

The engine 110, like the engine 10, is a compression ignition engine. Also as in the engine 10 high compression ratios are maintained in the engine 110 preferably in the range between 24-1 and 30-1. Unlike the engine 10, however, the compression ratio once built into the construction of the engine 110 will be maintained throughout its range of operation. Also as in engine 10 the volume of the pre-combustion chamber 120 is somewhere in the range of 75% to 80% of the combined volume of the pre-combustion chamber 120 and the main combustion chamber 116 at TDC of the piston 128.

It has been found that the combination of relatively high compression ratios and the relatively high volume of the pre-combustion chamber with respect to the volume of the main combustion chamber at TDC of the piston produces an engine in which the emissions of $NO_x$ and hydrocarbons are significantly reduced. $NO_x$ levels of emission have been particularly difficult to reduce. The goal that has been provided for the particular ERDA program out of which the present invention evolved for instance is 4 grams per mile. This goal has not been achievable with engines of conventional design. Applicant has with the present design been able to achieve an emissions level of 1.73005 grams $NO_x$ per mile during an urban driving cycle and 1.58333 grams $NO_x$ per mile during a highway driving cycle. These significant results are attributed in the major part to the high compression ratios and more particularly to the relatively large volume of the pre-combustion chamber.

FIGS. 3 and 4 illustrate diagrammatically and by chart two other preferred modifications which contribute to the reduction in the level of emissions of $NO_x$ and hydrocarbons.

In FIG. 4 the engine 10 is illustrated diagrammatically as including a supercharger 50 the compressor portion 52 of which provides supercharged air to the intake line 54 of the engine 10. The engine 10 is provided with an exhaust system represented by the arrow 56 and a conduit 58 connects the exhaust system 56 to the intake line 54 to recirculate at least part of the exhaust gases over at least the light and medium load operation of the engine. A direct connection is all that is necessary to achieve exhaust gas circulation because during loads up to approximately 40% of maximum, exhaust back pressure exceeds manifold air pressure and thus exhaust gases will flow into the intake line 54. At engine loads above approximately 40%, intake pressure will be greater than exhaust pressure and there will therefore be no exhaust gas recirculation. Emission control is most crucial at partial load conditions of the engines and thus the disclosed method of exhaust gas recirculation provides a simplified but effective means to aid in the control of the level of emissions, especially at light to medium load levels. Since the exhaust gases are not recirculated through the compressor there are no problems with wear of the compressor parts as ordinarily occurs in such systems.

FIGS. 3 and 4 also illustrate the difference between the timing of the initiation of fuel injection from the injector 24 in the present systems as compared with previous systems. The dashed line A represents initiation of fuel injection in prior art compression ignition engines. As shown in the graph of FIG. 3 such fuel ignition is conventionally initiated at approximately 10° crank angle prior to TDC of the piston during the compression stroke of the engine. In the present engine fuel injection is significantly retarded and is preferably initiated somewhere in the range between 5° crank angle before TDC to 20° crank angle after TDC. Again this severe retarding of the initiation of fuel injection significantly contributes to the reduction in the level of $NO_x$ emissions.

The high compression ratios of the engine of the present invention permit the severe firing retardation without producing misfirings and an increase in hydrocarbon emissions.

Preferably as indicated by the dashed line B in FIG. 3 retardation is variable with engine load although it should be understood that making the retardation responsive to increases in engine speed would also be satisfactory. To accomplish this a fuel injection means 60 (FIG. 4) is provided having engine speed or engine load sensing means 62 so that fuel injection initiation is varied with engine load or engine speed in the manner illustrated graphically in FIG. 3.

It is apparent that the present invention provides an engine in which significant reductions in the level of exhaust emissions have been achieved. These reductions are especially important as they relate to $NO_x$ levels because heretofore these emissions have been the most difficult to deal with. The relationship between the volume of the pre-combustion chamber and the volume of the main combustion chamber makes the greatest contribution to the reduction of $NO_x$. The compression ratios, the exhaust gas recirculation and the retardation of fuel injection contribute to the reductions in $NO_x$ and in hydrocarbons.

While it is preferred that the present invention be embodied in a VCR engine because higher compression ratios can be achieved at light and medium loads than with ordinary engines, it is apparent from the description with reference to FIG. 2 that the present invention can also be incorporated in conventional compression-ignition engines with significant results.

It is also apparent that although I have described but several embodiments of the present invention many changes and modifications can be made therein without departing from the spirit of the present invention or the scope of the appended claims.

I claim:

1. An internal combustion engine having a cylinder and a piston movably mounted in said cylinder, said pistion being movable toward a top dead center position, a main combustion chamber formed in part by said piston, and having a volume which is at a minimum when said piston is at said top dead center position, a pre-combustion chamber opening to said main combustion chamber, means for introducing air into said main chamber and fuel into said pre-combustion chamber whereby said air will be directed into said pre-combustion chamber to ignite with said fuel to thereby provide ignition of the fuel and air in said main combustion chamber, the volume of said pre-combustion chamber being in the range of 70% to 85% of the combined volume of said pre-combustion chamber and said main combustion chamber when said piston is at said top dead center position, means for sensing the load of said engine and means responsive to said sensing means for initiating injection of fuel into said pre-combustion chamber within the range of 5° crank angle of said piston before said top dead center position to 20° crank angle after top dead center position at low engine loads and for decreasing fuel injection retardation with increasing engine load.

2. The invention as defined in claim 1 and in which the compression ratio of said engine is in the range between 24-1 and 30-1.

3. The invention as defined in claim 1 and in which said engine has an intake connected with said main combustion chamber and including means for supercharging the air delivered to said intake.

4. The invention as defined in claim 3 and in which said engine is provided with means for exhausting gases from said main combustion chamber and including means connecting said exhausting means to said supercharging means whereby at least a portion of the exhaust gases are recirculated to the intake of said engine.

5. The invention as defined in claim 4 and in which said supercharger is provided with a compressor having an outlet opening to said intake of said engine and in which said connecting means is connected directly to said compressor outlet.

6. The invention as defined in claim 4 and in which said connecting means is operable to direct said exhaust gases to said supercharging means only over a portion of the operating range of said engine.

7. The invention as defined in claim 1 and including means for automatically varying the compression ratio of said engine from a highest compression ratio at low load conditions of said engine to a lowest compression ratio at high load conditions of said engine.

8. An internal combustion engine having a cylinder and a piston movably mounted in said cylinder, said piston being movable toward a top dead center position, a main combustion chamber formed in part by said piston, and having a volume which is at a minimum when said piston is at said top dead center position, a pre-combustion chamber opening to said main combustion chamber, means for introducing air into said main chamber and fuel into said pre-combustion chamber whereby said air will be directed into said pre-combustion chamber to ignite with said fuel to thereby provide ignition of the fuel and air in said main combustion chamber, the volume of said pre-combustion chamber being in the range of 70% to 85% of the combined volume of said pre-combustion chamber and said main combustion chamber when said piston is at said top dead center position; and in which said engine has an intake connected with said main combustion chamber, means for supercharging the air delivered to said intake, said supercharger means being provided with a compressor having an outlet opening to said intake of said engine, said engine being provided with means for exhausting gases from said main combustion chamber, means connecting said exhausting means to said compressor outlet whereby at least a portion of the exhaust gases are recirculated to the intake of said engine only at engine loads less than 40% of maximum engine load.

9. The invention as defined in claim 8 and in which the compression ratio of said engine is in the range between 24-1 and 30-1.

10. The invention as defined in claim 8 and including means for automatically varying the compression ratio of said engine from a highest compression ratio at low load conditions of said engine to a lowest compression ratio at high load conditions of said engine.

11. The invention as defined in claim 8 and including means sensing the load of said engine and means initiating fuel injection dependent upon said load.

* * * * *

UNITED STATES PATENT AND TRADEMARK OFFICE
CERTIFICATE OF CORRECTION

PATENT NO. : 4,141,324
DATED : February 27, 1979
INVENTOR(S) : Albert M. Karaba

It is certified that error appears in the above-identified patent and that said Letters Patent are hereby corrected as shown below:

Column 1, line 27, insert --or-- before diesel engines therefor;
Column 2, line 1, delete "precombustion" and insert --pre-combustion-- therefor;

Signed and Sealed this

Third Day of July 1979

[SEAL]

Attest:

LUTRELLE F. PARKER
Attesting Officer    Acting Commissioner of Patents and Trademarks